No. 829,763. PATENTED AUG. 28, 1906.
A. H. BURT, H. JACKSON & C. A. FINCH.
APPARATUS FOR THE EXTRACTION OF GREASE FROM WOOL.
APPLICATION FILED JUNE 9, 1905.
4 SHEETS—SHEET 1.
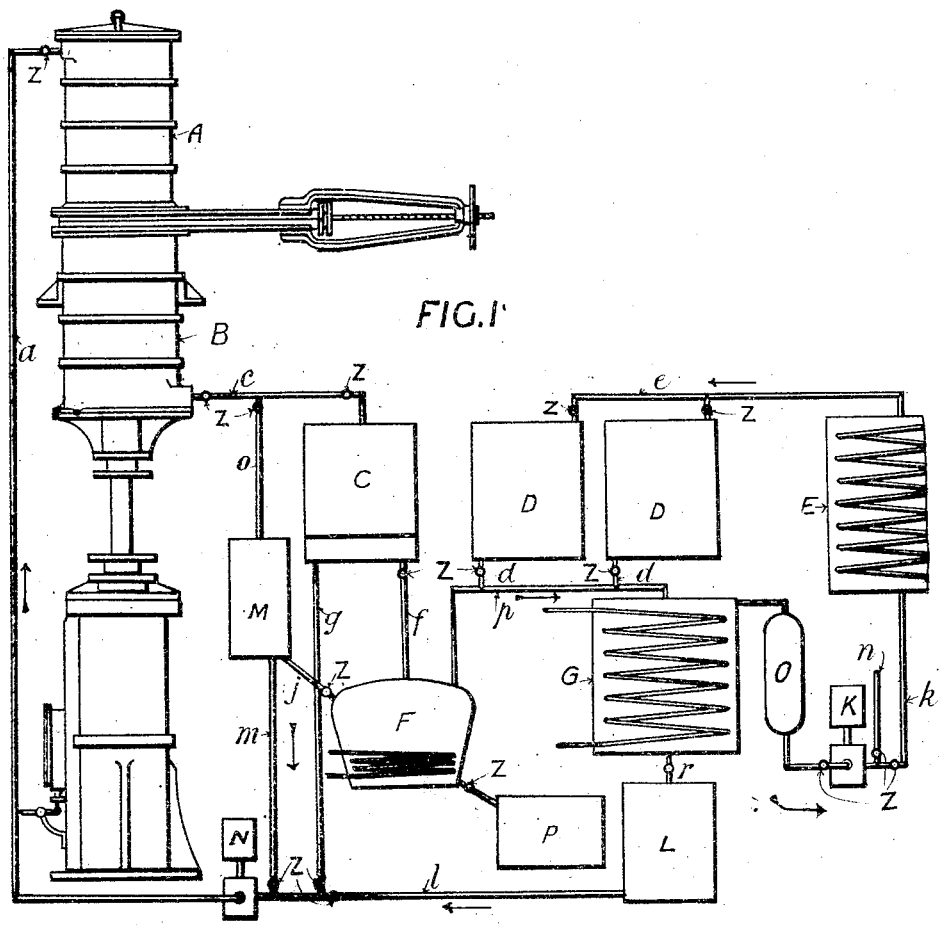
FIG. I
Witnesses
Inventors
Arthur Hazeldine Burt
Henshaw Jackson
Charles Allt Finch
by Henry Counsell
Attorney No. 829,763. PATENTED AUG. 28, 1906.
A. H. BURT, H. JACKSON & C. A. FINCH.
APPARATUS FOR THE EXTRACTION OF GREASE FROM WOOL.
APPLICATION FILED JUNE 9, 1905.
4 SHEETS—SHEET 2.
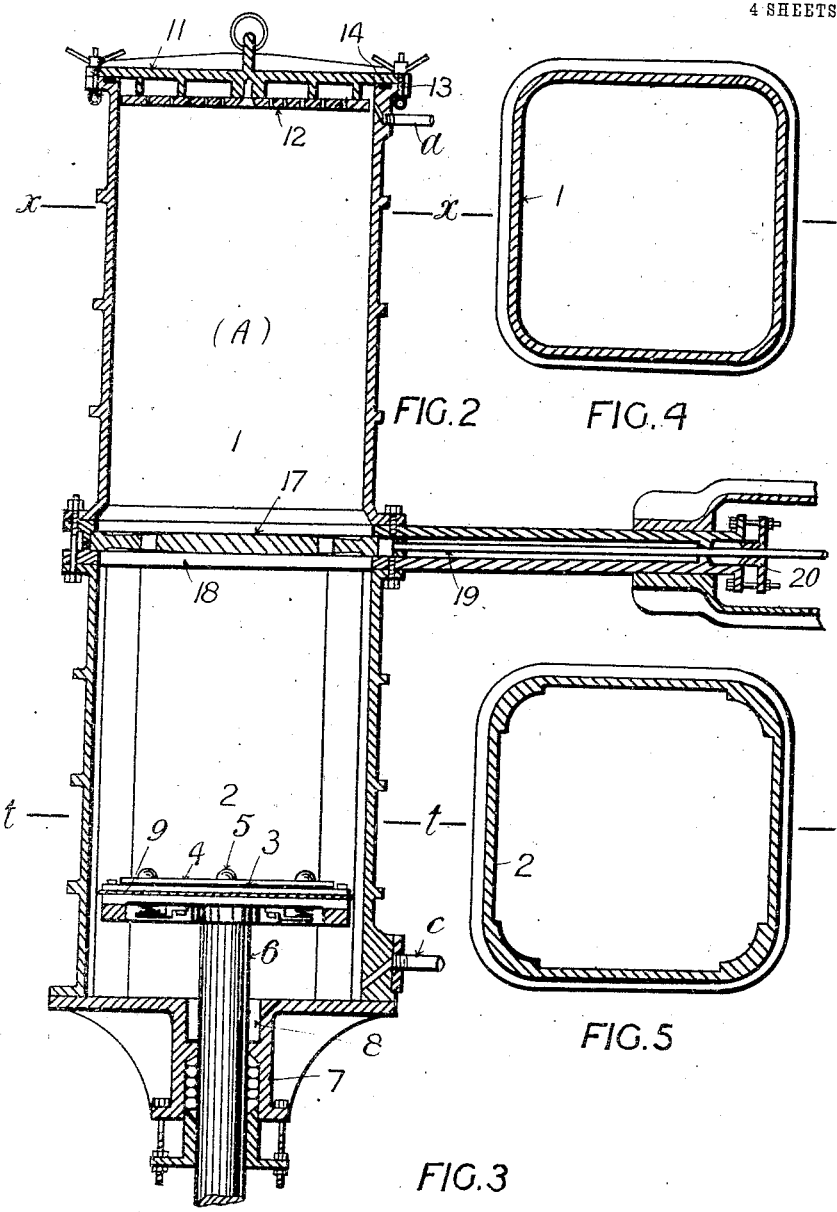
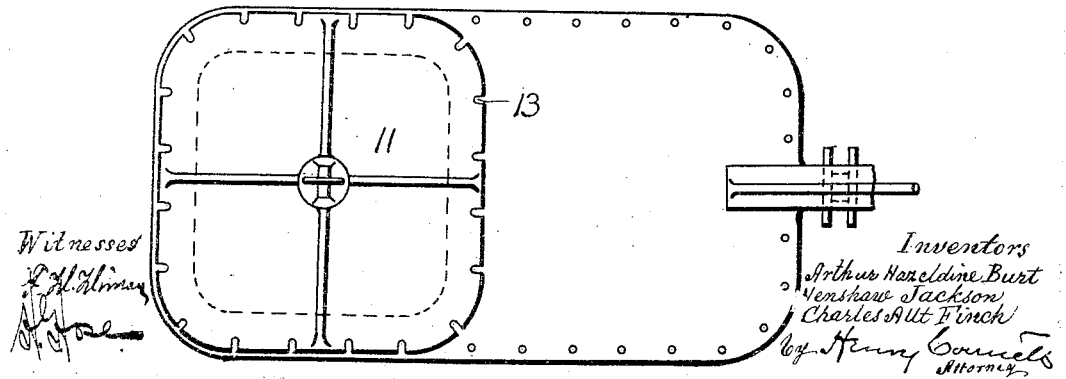

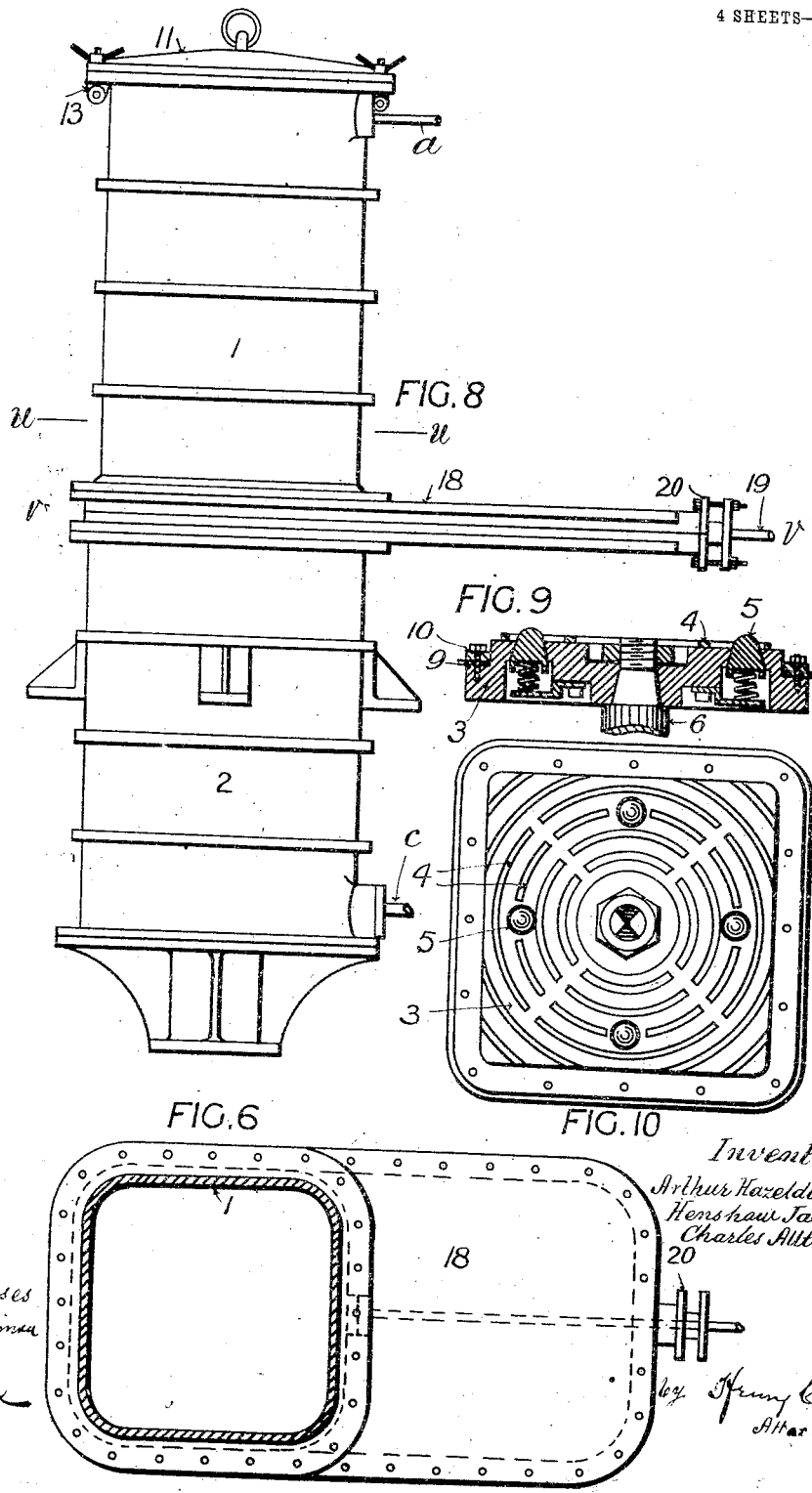

No. 829,763. PATENTED AUG. 28, 1906.
A. H. BURT, H. JACKSON & C. A. FINCH.
APPARATUS FOR THE EXTRACTION OF GREASE FROM WOOL.
APPLICATION FILED JUNE 9, 1905.
4 SHEETS—SHEET 4.
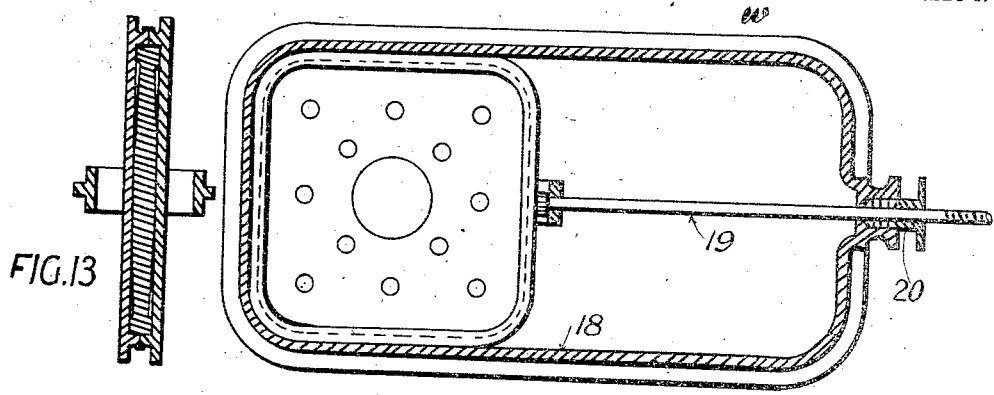
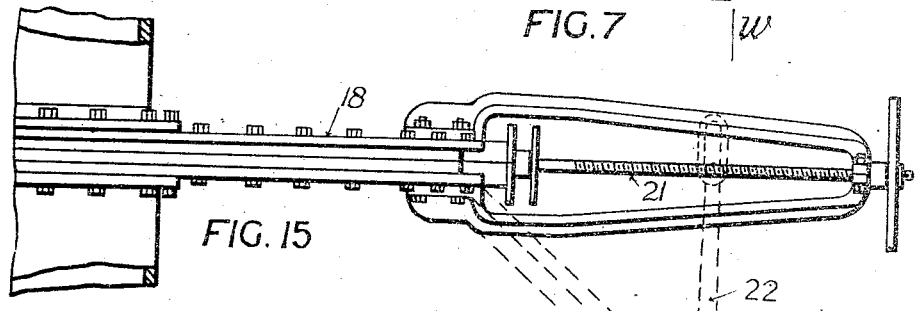
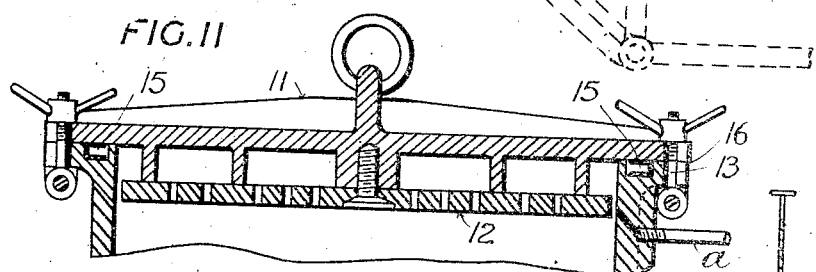

UNITED STATES PATENT OFFICE.

ARTHUR HAZELDINE BURT, OF MOSMAN, NEAR SYDNEY, AND HENSHAW JACKSON AND CHARLES ALLT FINCH, OF SYDNEY, NEW SOUTH WALES, AUSTRALIA.

APPARATUS FOR THE EXTRACTION OF GREASE FROM WOOL.

No. 829,763.  Specification of Letters Patent.  Patented Aug. 28, 1906.

Application filed June 9, 1905. Serial No. 264,467.

*To all whom it may concern:*

Be it known that we, ARTHUR HAZELDINE BURT, of Mosman, near Sydney, and HENSHAW JACKSON and CHARLES ALLT FINCH, of Sydney, State of New South Wales, in the Commonwealth of Australia, subjects of the King of Great Britain, have jointly invented certain new and useful Improvements in Apparatus for the Extraction of Grease from Wool, of which the following is a specification.

Our invention relates to apparatus for operating a process by which grease is extracted from wool by means of volatile solvents, such as benzin.

While our apparatus is adapted for operating on loose masses of wool, it was devised, primarily, for obtaining grease from wool in bales without breaking the packs, so as to utilize the packs as filters to retain solid and non-soluble matters, and incidentally to clean the packs and render them fit for reuse with scoured wool.

The extraction of wool-fat from baled wool without opening the packs is of much importance commercially, as it is thereby made possible to obtain the fat by operating on unbroken bales at any convenient place during transit. The process may therefore be carried out on a large and economical scale at shipping centers or rail junctions, where large quantities of wool are handled, without involving any change or delay in forwarding arrangements. At the same time a reduction is made in the weight of the bale, and a consequent saving in freight thereon is effected.

In carrying out our invention we use a connected series of apparatus in which the solvent is protected against atmospheric vaporization during the several steps of the process and is recovered for reuse and is reused continuously. In this apparatus the wool is placed in a close press-chamber provided with a piston or lifting false bottom operated by a ram which is worked by hydraulic or other power. A body of solvent liquid is introduced into this press-chamber as soon as the same has been closed. To insure complete penetration of the solvent into the heart of the bale, inspirating-needles (with button-heads to facilitate insertion and withdrawal) are driven downward into the bales. Complete saturation of the wool in the bale is effected by submitting the same to a number of successive compressions by reciprocating the piston, whereby the solvent is alternately squeezed out of and allowed to resoak the wool. The fat-charged solvent after withdrawal from the press-chamber is run through a filter in which wool may be used for a filter-bed, and the filtered liquid is thence conveyed to a still, wherein the volatile liquid is driven off to a condenser fitted with an air-pump and is thence returned to the solvent-tank for reuse. After final pressing in the press-chamber to squeeze out the free liquor the wool is lifted into a closed drying-box, through which a draft of air is pumped or drawn by vacuum. This air takes up the absorbed solvent and carries it through the condenser, in which it is extracted and whence it passes to the solvent-tank. The semisolid residue in the still is treated by pressure and otherwise for the purification of the wool-fat according to known processes. The piping and valve arrangements are so disposed that the same charge of solvent may at will be reused for two or more bales successively or so that a second (rinse) charge of fresh solvent may be applied, so as to more completely dissolve out the fat. The press-chamber may be provided with an intermediate grating to sustain the top of the bale while pressure is applied to it below by means of the piston to effect the solution of the grease by regurgitating the solvent through the wool.

In the annexed drawings, Figure 1 is a diagrammatic figure explanatory of the general arrangement of the several parts of the apparatus; Fig. 2, a vertical section through the press-chamber; Fig. 3, a top plan; Fig. 4, a horizontal section through upper part of same on line *x x;* Fig. 5, a similar horizontal section through lower part of same on line *t t;* Fig. 6, a sectional horizontal plan on line *u u;* Fig. 7, a horizontal section on line *v v;* Fig. 8, a side elevation of press-chamber; Fig. 9, a detailed fragment view showing section of piston; Fig. 10, a plan of piston; Fig. 11, a fragment vertical section illustrating fastening of the head 11 of the press-chamber; Fig. 12, a fragment plan referring thereto; Fig. 13, a vertical section on line w w; Fig. 14, an elevation showing inspirator-needle; Fig. 15, a fragment side elevation showing gear for moving the divisional grating.

Referring to Fig. 1 in the annexed sheet of explanatory drawings, A is the press-chamber; B, the ram-cylinder; C, the filter-box, and D a series of two or more drying-chambers. E is the air-heater; F, the still; G, the condenser; K, air-pump; L, solvent-tank; M, auxiliary solvent-tank; N, the solvent-pump; O, vacuum-cylinder, and P grease-tank. If it be found convenient to place the condenser G and the solvent-tank L above the level of the press-chamber A, the solvent may be allowed to flow by gravity, in which case the solvent-pump may be dispensed with; but it is generally preferred to adopt the arrangement in which the solvent is moved positively by the pump N. The solvent is supplied from the pump N to the press-chamber A through the pipe $a$. The solvent-pump N draws its supply of solvent from the tank L through the pipe $l$. The solvent-pump N has also a connection through the pipe $m$ with the auxiliary solvent-tank M, into which grease-laden solvent from the press-chamber A passes by the pipe $o$. $z z$ represent valves in the pipes. The bottom end of the press-chamber A is connected by the pipe $c$ to the filter C, which may be made to act either upwardly or downwardly. $f$ is a pipe for delivering filtered grease-laden solvent from the filter C to the still F, which latter is heated by a coil supplied with superheated steam. $g$ is a by-pass connection between the filter C and the pipe $l$, and $j$ a pipe connection between the auxiliary tank M and the still F. The vaporized solvent passes by the pipe $p$ to the condenser G. There are also pipe connections $d$ from the several drying-boxes D to the pipe connection $p$ between the still F and the condenser G. These drying-boxes have each a valve in the head through which atmospheric air may be admitted to them, and they are also provided with pipe services $e$ to convey heated air from the air-heater E, which is warmed by a steam-coil. The mixed air and the condensed vapor which pass from the condenser G enter the vacuum-reservoir O and thence pass to the air-pump K, which delivers the same to the air-heater E through the pipe $k$ or to waste through the outlet $n$. The solvent condensed in the condenser G passes by the pipe $r$ (which is fitted with a non-return valve) to the solvent-tank L, whence it is conveyed, as before stated, by the pipe $l$ to the force-pump N, and thence for reuse to the press-chamber A. The one charge of solvent may be used repeatedly, if desired, by leaving it in the press-chamber until it becomes fully charged with grease by repeated treatment of successive bales of wool. It will be observed that by operating the valves Z the same charge of solvent can be circulated through the press-chamber A and the filter C as often as may be found necessary and finally run into the still F through the pipe $f$, or at the option of the operator the first charge of solvent laden with grease may be run into the still F from the filter C through the pipe $f$, and a rinse charge of fresh solvent then circulated by means of the pump N through the wool in the press-chamber A, and thence to the auxiliary solvent-tank M through the pipe $o$, whence it may be drawn through the pipe $m$ to the pump N and used on another bale of wool in the press-chamber A.

The form of the press-chamber which we use in practice is shown in Figs. 2 to 13. It consists of two chambers superposed, of which the upper one, 1, is of less area than the lower one, 2, but in alinement therewith at the corners, so that the corner parts will form a continuous guide for the plunger or piston 3 throughout its stroke. This piston is covered on the face with grating-bars 4 and is fitted with two or more spring-sustained drop-valves 5, whose heads rise above the face of the grating-pieces 4, the object being that these valves shall be forced open by contact against the lower side of the bale of wool which is dropped into the chamber. The piston 3 is carried on a ram or rod 6, in the upper side of whose stuffing-box 7 a water-well 8 is formed to check escape of the volatile solvent through the packing. The piston is guided at its four corners by direct contact with the interior surface of the corners of the chambers, and it is provided with a leather lip-packing 9, carried by a junk-ring 10. This packing makes a vapor-retaining joint in the upper section 2 of the chamber, but leaves a gap at the four sides of the piston when the same is in the lower section 2 of the chamber. The top closure is a reinforced cap-plate 11, with a perforated false lining 12, the perforations being provided to allow free access and exit of solvent to and from all parts of the upper surface of the bale when it is under compression by the piston. The solvent-supply pipe $a$ conveys the solvent to the cavity between the false plate 12 and the head 11. The head is secured, preferably, by pivot-bolts 13, whose wing-nuts take against lugs 14 on the head. 15 is a ring pump-leather inserted in an annular cavity below the joint 16 to make said joint liquor and vapor tight. Intermediate of the upper and lower chambers 1 and 2 is a divisional grating 17, which may be formed of slotted or drilled plate adapted to run in a carrier-guide 18. This plate 17 is manipulated by a spindle 19, which is carried through a stuffing-box 20 and is operated by a hand-screw 21 or by a lever 22, connected to it through a link, or by a pin working in a slot.

In operation, the rack-plate 17 being retired, the bale of wool is dropped into the press-chamber and the head 11 closed down. Solvent is then run through the pipe $a$, completely immersing the bale and soaking the same by direct absorption through its exterior surface and also through the inspirating-needles, which are driven into it from the top end before it is inserted into the press-chamber. The piston 3 being drawn down to the lower end of the chamber and the grating 17 closed in over the top of the bale, which is now completely submerged in the solvent liquor, pressure is applied to the ram 6 two or three times or oftener, so as to cause the solvent to surge through the wool in the bale and dissolve the wool-fat contained therein. Finally, the grating 17 is retired and the head 11 is put under pressure against the free solvent in order to squeeze out the free solvent. The solvent is run off through the pipe $c$ either to the filter C or to the auxiliary solvent-reservoir M. The head 11 is now removed and the bale raised up by exerting pressure on the ram 6 and lifted into one of the drying-boxes D, which is closed down on it and the hot-air $e$ and exhaust $d$ services opened. The remaining solvent is thus evaporated out of the bale and recondensed in the still G for reuse. The inspirating-needles are not withdrawn until after the dried-out bale is taken from the drying-box, as they serve to convey air into and vapor out of the bale.

The provision of the intermediate grating 17 and accessory parts is not essential, as it is practicable to press the bale directly against the false head 12, provided that the solvent has freedom to surge past the piston. The leather packing-ring of the piston is provided only to prevent vaporization of solvent when the piston is raised up near the top of the chamber and the head 11 opened while the bale is being inserted and lifted out.

The leather packing does not fill the clearance between the sides of the chamber 2, and the piston and the solvent is therefore free to surge past the piston during the operation of repeatedly compressing the wool and relieving the pressure thereon to effect solution of the grease by regurgitating the solvent through the wool. When a press-chamber of identical form throughout its length is used and the wool pressed directly against the head of the chamber, the leather packing must be made sufficiently flexible to permit the solvent to flow past it to and from the space below the piston, while when there is no pressure it must close up to the chamber-walls to prevent vaporization of the solvent contained in the chamber. The automatic valves 5 are kept open by the weight of the wool thereon; but when the wool is lifted out of the press they are closed by their supporting-springs and thus seal the space below the piston and prevent loss of solvent by evaporation.

It may be explained that the inspirating-needle (seen in Fig. 14) is tubular, closed at the point but open at the head end, and provided with a head and with numerous perforations in its walls.

What we claim as our invention, and desire to secure by Letters Patent, is—

1. An apparatus for the purpose specified, having a press with a chamber to receive the baled wool and liquid solvent and a piston to compress the wool, a filter C to receive the grease-charged solvent from the press and separate the solid matter therefrom a cock-controlled pipe connecting the press-chamber with said filter, a still F, for volatilizing said solvent, a cock-controlled pipe connecting said filter with the still, a condenser G to condense the vapors from the still, a pipe connecting said still and condenser, a receiver connected with the condenser to receive the liquid solvent from the same, a pump N for delivering liquid solvent to the press-chamber, pipes connecting the pump on its eduction side with the press, and on its induction side with said receiver, drying-boxes D for the wool, an air-pump K, a pipe connecting the induction side of said pump with the condenser-chamber for clearing it, pipe connections between the eduction side of said air-pump and the drying-boxes D for circulating air through the latter, and pipe connections between the respective drying-boxes and the pipe leading to the condenser.

2. A press for the purpose specified, having a compressing-piston provided with valves and ports controlled thereby, the said valves normally closing the ports, and some portions thereof extending through the respective ports and beyond the surface of the piston on which the wool bears, whereby the latter, in the operation of pressing, forces the valves open.

3. A press for the purpose specified, having a ported piston 3, provided with a wool-supporting grid 4, on its pressing-face, conical valves 5, which project normally through the respective ports from the back of the piston and out beyond the surface of said grid, and springs which hold the respective valves closed.

4. In apparatus for extracting wool-fat by means of solvents, for the purpose of facilitating the pressing of the wool in the press-chamber, a sliding grid or rack-plate working between the upper and the enlarged lower section of said press-chamber, substantially as described.

5. In a press-chamber, for the purposes set forth the combination of an upper section and a lower section of larger area, a piston movable vertically through said chambers and fitting the upper section but free in the lower section thereof, spring-supported valves in the piston, a flexible packing-ring on the piston, a packed cover with a perforated false head, solvent service and draw-off pipes, and means for reciprocating the piston vertically, substantially as described.

In testimony whereof we have signed our names to this specification in the presence of two subscribing witnesses.

ARTHUR HAZELDINE BURT.
HENSHAW JACKSON.
CHARLES ALLT FINCH.

Witnesses:
N. RILEY,
W. I. DAVIS.